United States Patent
Rao et al.

(10) Patent No.: US 7,774,636 B2
(45) Date of Patent: Aug. 10, 2010

(54) METHOD AND SYSTEM FOR KERNEL PANIC RECOVERY

(75) Inventors: Pramod Sathyanarayana Rao, Bangalore Karnataka (IN); Lal Samuel Varghese, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 398 days.

(21) Appl. No.: 11/873,736

(22) Filed: Oct. 17, 2007

(65) Prior Publication Data

US 2008/0104441 A1 May 1, 2008

(30) Foreign Application Priority Data

Oct. 31, 2006 (IN) .................. 2003/CHE/2006

(51) Int. Cl.
*G06F 11/00* (2006.01)
(52) U.S. Cl. .......................... 714/2; 714/15; 714/38
(58) Field of Classification Search ............... None
See application file for complete search history.

(56) References Cited

U.S. PATENT DOCUMENTS

| 7,523,344 B2* | 4/2009 | Qiao et al. ................ 714/6 |
| 2005/0204199 A1* | 9/2005 | Harper et al. ............. 714/38 |
| 2006/0075299 A1* | 4/2006 | Chandramouleeswaran et al. ..................... 714/38 |

* cited by examiner

*Primary Examiner*—Michael C Maskulinski

(57) ABSTRACT

A method of kernel panic recovery, comprising detecting a kernel panic of a first kernel, retrieving at least some of a state of at least one thread running on the first kernel, and restoring the state of the at least one process on a second kernel.

19 Claims, 2 Drawing Sheets

METHOD AND SYSTEM FOR KERNEL PANIC RECOVERY

RELATED APPLICATIONS

The present application is based on, and claims priority from, Indian Application Number 2003/CHE/2006, filed Oct. 31, 2006, the disclosure of which is hereby incorporated by reference herein in its entirety.

FIELD OF THE INVENTION

This invention relates to a data processing system and method, for example, for kernel panic recovery.

BACKGROUND TO THE INVENTION

An operating system kernel is the part of the operating system that lies between the physical hardware layer and the software layer. FIG. 1 shows a computing system 100 where a kernel 102 manages the interaction between software layer 104 and hardware layer 106. The kernel 102 provides a hardware abstraction layer that is used by the software 104 to communicate with and utilise the hardware 106. The software layer 104 may include system software that includes operating system software, and/or application software that includes applications to perform tasks required of the computing system 100.

Kernel panics occur when a process in the kernel encounters an unrecoverable error. Examples of unrecoverable errors include hardware failure and bugs in the kernel. The operating system may include panic routines that are executed when a kernel panic occurs. The panic routines may create a "crash dump" where the contents of some or all of the physical memory of the computing system are stored as a file on permanent storage such as a hard disk. The panic routines may display a message on a display device, such as a monitor, indicating that a kernel panic has occurred, and may provide information relating to the kernel panic. The panic routines may then restart the computing system on which the kernel was running before the kernel panic occurred. The kernel panic routines may, alternatively, wait for another computing system running a debugger to connect to the kernel and debug the kernel panic.

When a kernel panic occurs, any computation performed by an application running on the computing system may be lost. To avoid this problem, the application and/or the operating system may store application checkpoints, which are a snapshot of the state of the processes associated with the application, at periodic intervals. In the event of a kernel panic, a computing system on which the kernel is running may be reset, and the state of the application may be restored to a previously stored state, so only computation performed since the last stored state is lost. However, storing the application checkpoints results in an overhead in the computing system, and the efficiency of the computing system and/or any applications running on it may be decreased. Furthermore, restoring the application typically requires action by a system administrator, which may be after an unspecified length of time. Also, if the operating system does not store application checkpoints, the application must be programmed to store application checkpoints.

It is an object of embodiments of the invention to at least mitigate one or more of the problems of the prior art.

BRIEF DESCRIPTION OF THE DRAWINGS

Embodiments of the invention will now be described by way of example only, with reference to the accompanying drawings, in which.

DETAILED DESCRIPTION OF EMBODIMENTS OF THE INVENTION

Figure 1:
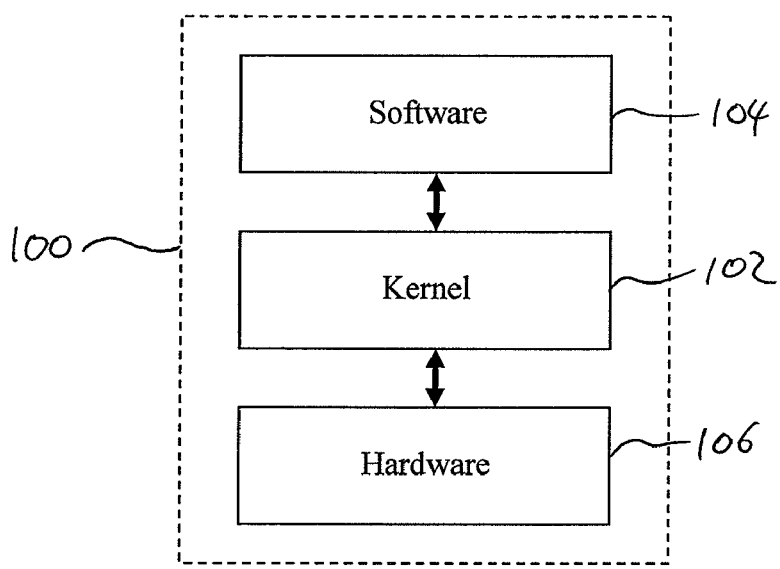
FIG. 1 shows an example of a computing system including hardware, software and kernel.
Figure 2:
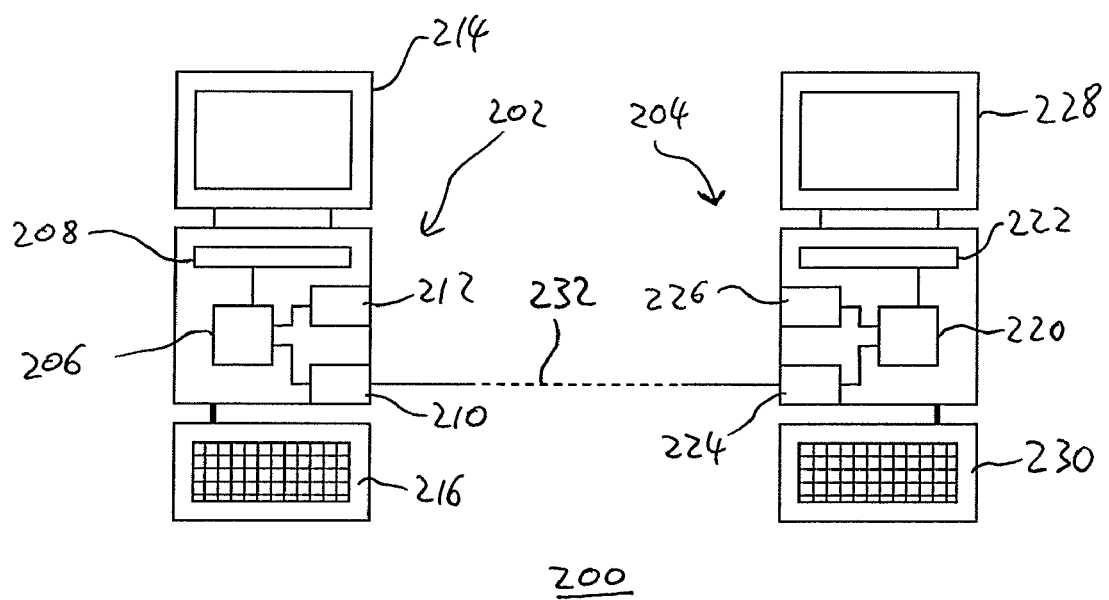
FIG. 2 shows an example of computing systems according to an embodiment of the invention.

The embodiment 200 shown in FIG. 2 includes a first computing system 202 and a second computing system 204. The first computing system 202 includes a processor 206 and main memory (for example, RAM) 208. The first computing system 202 may also include a communications device 210, a storage device 212 such as a hard disk, a display device 214 such as a monitor, and/or an input device 216 such as a keyboard. Similarly, the second computing system 204 includes a processor 220 and main memory (for example, RAM) 222, and may also include a communications device 224, a storage device 226 such as a hard disk, a display device 228 such as a monitor, and/or an input device 230 such as a keyboard.

The first 202 and second 204 computing systems are in communication with each other via the communications devices 210 and 224 and a network 232. The network 232 may include a wired and/or wireless network, such as one or more of a LAN, WAN, 802.11 wireless connection, mobile telecommunications, USB, or any other type of wired and/or wireless connection. Communications between the first 202 and second 204 computing systems may additionally or alternatively be effected by, for example, transferring storage, such as, for example, a hard disk, floppy disk, optical disk, flash memory and/or other computer readable storage, between the computing systems.

A first operating system kernel is running on the first computing system 202, and at least one application running on the kernel. The second computing system 204 includes a second operating system kernel, which may be running or which may be stored and/or suspended until such a time as it is required to run on the second computing system 204. The first and second kernels may be kernels of the same or different operating systems. In example embodiments of the invention, the first and second kernels are kernels of the HP-UX operating system.

In the event of a kernel panic of the first kernel on the first computing system 202, the second computing system 204 detects that a kernel panic has occurred. This may be done in one or more of a number of ways, including, for example, the kernel panic operating system routines of the first kernel sending a communication to the second computing system 204 using the network 232, the second computing system 204 monitoring the first kernel and/or the application using the network 232 to detect whether the kernel and/or application has become unresponsive, and/or intervention by a system administrator. The method 300 includes a step 302 of detecting a kernel panic of the first kernel.

Figure 3:
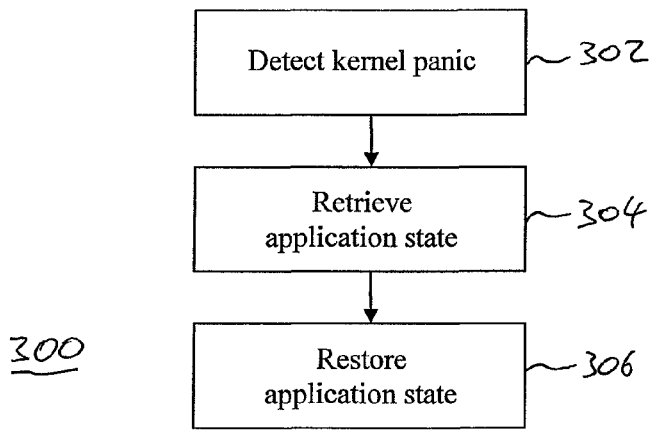
FIG. 3 shows an example of a method of kernel panic recovery according to an embodiment of the invention.

FIG. 3 shows a method 300 according to an embodiment of the invention. Once detection has occurred, at least some of the state of an application running on the first kernel is retrieved at step 304. Enough of the state of the application is retrieved from the first computing system 202, shown in FIG. 2, to allow the application to continue running on the second kernel on the second computing system 204. The second computing system 204 may retrieve the appropriate parts of the application state by connecting to the first computing system 202 using the communications devices 210 and 224 and the network 232, and downloading the parts of the application state. The parts of the application state may be found, for example, in the main memory 208 and/or the crash dump on the storage 212 within of the first computing system 202. The kernel panic routines of the first kernel running on the first computing system 202 may include suitable features that allow the second computing system 204 to interrogate the storage 212 and/or the main memory 208 if appropriate.

Referring back to FIG. 3, once at least some of the application state has been retrieved at step 304, the application state is restored on the second kernel on the second computing system 204 at step 306. The second computing system 204 may then continue running the application without any loss of computation that was performed by the application on the first computing system 202 before the first kernel encountered a kernel panic.

The first kernel may be implemented in embodiments of the invention, for example, using the HP-UX operating system version 11i v2 and later. The kernel in such an operating system starts a kernel-resident debugging program in the event of a kernel panic, and waits for an external computing system to connect to the kernel and debug the cause of the problem. The second kernel may then interact with the first kernel, storage 212 and/or main memory 208 of the first computing system 212 though the debugging routines of the first kernel. The infrastructure can be used, for example, to read at least some of the state of a process associated with an application running on the first kernel on the first computing system 202.

Figure 4:
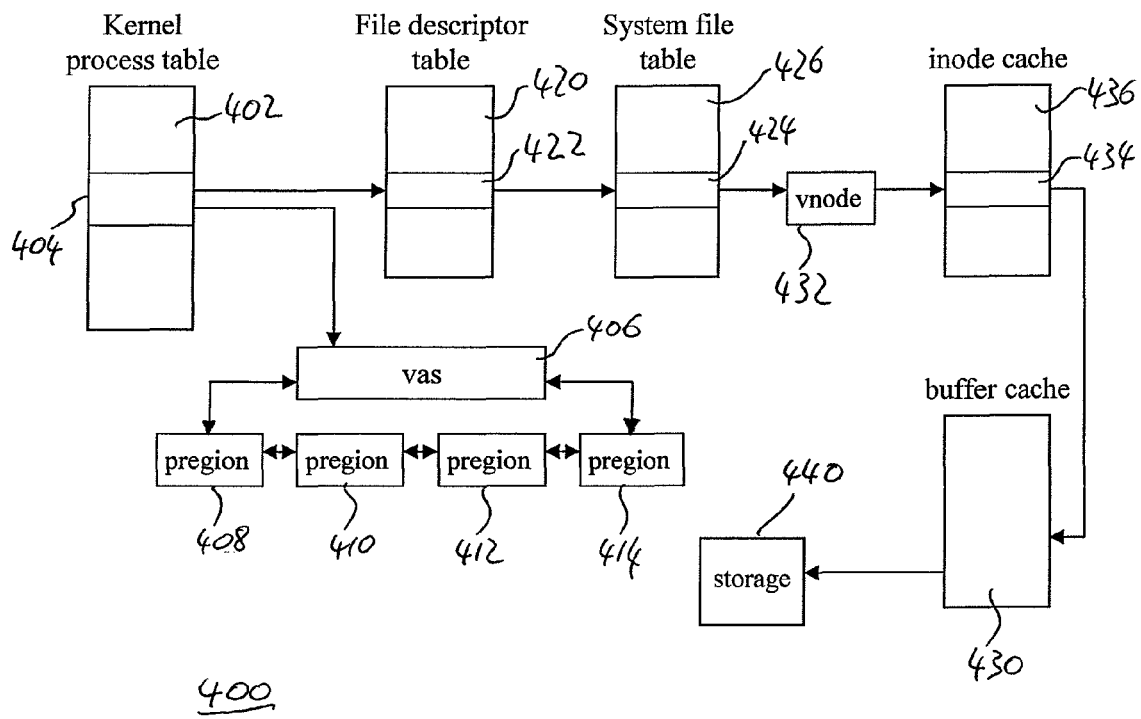
FIG. 4 shows an example of data structures of a processes running on an operating system kernel.

FIG. 4 shows data structures 400 associated with a process that is running on the first kernel. The data structures 400 include a kernel process table 402 that contains a list of all processes running on the kernel. The kernel process table 402 contains, for example, an entry 404 corresponding to a process associated with an application. The entry 404 points to a virtual address space (vas) 406. The vas 406 is the area of main memory (such as main memory 208 of the first computing system 202 shown in FIG. 2) that is assigned to the process 404, although some or all of the area of main memory may also be assigned to other processes.

The vas 406 includes a linked list of pregion data structures 408, 410, 412 and 414. Four pregion data structures are shown, although a process may have more or fewer pregion data structures. Each pregion data structure specifies an area of main memory and has a specific type. Examples of types of pregion data structure include text, data, stack, shared memory and uarea. A text pregion contains the executable code of the process that is to be executed on a data processor (such as processor 206 of the first computing system 202 shown in FIG. 2). The code includes code from, for example, an application executable file associated with the process, and may also include code from shared libraries that are used by the application and/or process. A data pregion includes the data associated with a process, and may include shared library data, initialized data and process heap. The shared library data includes data used by any shared libraries used by the process. The initialized data includes data contained within, for example, the application executable file associated with the process. The process heap includes memory that is dynamically allocated by the process during execution of the process. A shared memory pregion contains a segment of main memory that is shared with one or more other processes.

A stack pregion contains the stack used by the process. A uarea pregion contains system call information, signal information and register information associated with the process. The register information includes the values of the processor registers when the state of the process was last saved due to a context switch, explained below.

The pregions of a process are generally private to the process, except for, for example, shared memory pregions. A process may contain a single thread or multiple threads. The threads of a process containing multiple threads share all of the pregions of the process, except for the uarea pregion. Each thread in a process is associated with its own uarea. Therefore, for example, threads of a process share the main memory associated with the data pregion of the process.

An operating system, such as, for example, the HP-UX operating system, may handle multiple processes and/or threads by timeslicing, that is, by giving each process and/or thread a certain length of time (a timeslice) to use the processor for processing. Once the timeslice has expired or the process gives up its timeslice or the timeslice is interrupted, the state of the process is saved by the kernel, for example to main memory, which performs a "context switch" to allow another process to use the processor. The saved process or thread may then continue execution at a later point in time when it is given another timeslice.

The entry 404 in the process table 402 may also point to a file descriptor table 420 that indicates files that have been opened by the process, if any. The files may be stored, for example, on the storage 212 of the first computing system 202 shown in FIG. 2, and/or on some other storage, such as, for example, storage in main memory and/or remote or external storage. When a file is opened, an entry, such as entry 422, is created in the file descriptor table 420. The entry 422 points to an entry 424 in the system file table 426. The entry 424 in the system file table 426 points to a buffer cache 430 via a vnode 432 and an entry 434 in the inode cache 436. The buffer cache 430 contains data, if any, that is waiting to be written to storage 440 such as, for example, storage 212 of the first computing system 202 of FIG. 2.

As indicated above, the method according to an embodiment of the invention retrieves at least some of the application state in step 304 of FIG. 3, being the state of a process associated with the application. The state of a process includes the text, data, stack, shared memory and uarea pregions, and also the file descriptor table of the process and any open files. Some or all of the state may be retrieved in embodiments of the invention. For example, where the second computing system 204 has access to an executable file associated with the application, the text pregion is not needed as the code of the process can be obtained from the executable file. The second computing system 204 may determine which process running on the first kernel is the application process, for example, because the process ID (PID) or name of the process is specified to the first 202 and/or second 204 computing system, for example by an administrator. The PID or name can be specified before or after the kernel panic.

In an embodiment of the invention, for example, the data, stack, shared memory (if any) and uarea pregions of the process associated with the application (the application process) are retrieved from the first computing system 202, for example from the main memory 208 and/or from a crash dump stored on the storage 212. Any shared pregions, containing data and/or code shared with other processes, may also be retrieved. Also, the file descriptor table of the application process is inspected to determine if the process has opened any files. The process may have opened one or more files for reading and/or writing. If the process has opened a file for reading, then this file may be copied onto the second computing system 204. For example, the file could be copied from the storage 212 of the first computing system 202 to the storage 226 of the second computing system 204 via the network 232 as shown in FIG. 2. Additionally or alternatively, the second computing system 204 may be able to access the file on the first computing system 202 (for example, on the storage 212) via the network 232. Additionally or alternatively, where the first 202 and second 204 computing systems share storage, such as, for example, a network-attached storage (NAS) attached to the network 232, open files may be stored on the shared storage.

If the application process has opened a file for writing, then data may be waiting to be written to the file in the buffer cache 430. The buffer cache 430 is inspected to determine whether it contains any data waiting to be written to the file. If there is data waiting to be written, then the file is updated with the appropriate buffer cache contents and then copied to the second computing system 204. Alternatively, the file may be copied to the second computing system 204, and then updated with the appropriate cache contents. If no data is waiting to be written to the file, then the file is copied to the second computing system 204. Alternatively, as for files opened for reading, the file opened for writing may not be copied and may instead be accessible, for example, on the storage 212 or a NAS via the network 232.

Next, the application state is restored according to step 306 shown in FIG. 3. An example of restoring the application state will now be described. First, a process that is part of or is running on the second kernel (running, for example, on the second computing system 204 shown in FIG. 2) calls the fork( ) system function. A system function is code provided by, for example, the second kernel, although it may alternatively be provided in other ways. The fork( ) system function causes the process to be split into two identical processes. Next, one of the processes calls the exec( ) system function with the application executable as an argument, which replaces the process with a process (the application process) containing code from the application executable. Code from shared libraries may also be loaded into the application process' text pregion, if required. The libraries may be accessible from the second computing system 204 or externally, for example from the storage 212 on the first computing system 202 via the network 232.

The application process may be created such that it does not start to execute immediately. The application process may be created, for example, under the control of the ttrace( ) system function. The application process can then be controlled such that it does not start executing before the state of the application process is updated using the application state retrieved from the first computing system 202.

Once the application process has been created, its state is updated using the application state retrieved from the first computing system 202. The pregions retrieved from the first computing system 202 such as, for example, the data, stack, shared memory and uarea pregions, are written into the vas of the process. This can be achieved, for example, using the ttrace( ) system function once or multiple times. Also, the file descriptor table of the process is updated to include entries from the file descriptor table retrieved from the first computing system 202. The system file table of the second kernel may also be updated to include the files opened by the process on the first kernel as appropriate.

The application process is, at this stage, ready to continue execution. No computation performed on the first computing system 202 has been lost, as the application process is ready to continue execution from the point immediately before the kernel panic of the first kernel. The application and associated process does not require additional programming to be compatible with embodiments of the invention, and there is no saving of application checkpoints and no associated overhead.

Furthermore, as the application is restored and executed on the second kernel on the second computing system 204, the application may continue execution before and during reset of the first computing system 202. This ensures that the application does not need to wait for the first computing system 202 to be reset. Also, where a kernel panic is detected automatically by the second computing system 204, embodiments of the invention can commence the method of restoring the application and running the application on the second kernel immediately, ensuring that there is little loss of computation time. Such an arrangement could also be used, for example, to enhance the operation of the system of application checkpoints, as an application does not need to wait for the first computing system to be reset to continue execution from the last saved checkpoint. Instead, the application can continue execution from the last saved checkpoint on the second computing system before and during reset of the first computing system.

Where an application running on a kernel comprises multiple processes, embodiments of the present invention may be used to restore the state of the multiple processes. When first created on, for example, the first kernel, the application comprises a single process (main process) created using code from an executable file. The main process may then create one or more further processes, and further processes may create one or more further processes. Each process has a unique process ID (PID) and also includes the PID of the parent process that created it. Therefore, embodiments of the present invention determine all of the processes (and/or threads associated with the processes) associated with an application using the parent PID information within each process. This information may be found, for example, in the kernel process table. At least some of the state of the processes and/or threads may be retrieved and restored on the second computing system. The code for the processes may be retrieved, for example, from the main memory 208 and/or the storage 212 in the first computing system 202, for example from executable files associated with the processes.

In other embodiments, the first and second computing systems may each comprise computing systems that contain one or more processors, or multiple computing systems that co-operate to run an operating system kernel, such as a cluster. In further alternative embodiments, the first and second kernels may reside on a single server that uses, for example, virtualization software and/or hardware to enable the two kernels to operate.

In alternative embodiments, a third computing system may be employed to detect a kernel panic of the first kernel, retrieve at least some of the application state of the application process and provide the state to the second kernel. In this embodiment, the second kernel would not monitor the first kernel and/or the application to detect a kernel panic.

In alternative embodiments, instead of retrieving application code from an executable file associated with the application and/or library code from shared libraries, the code could instead be retrieved from the text segment of the process running on the first kernel.

In alternative embodiments, at least the state of one or more threads of a process rather than the process itself may be retrieved and restored to a thread on the second kernel. This allows separate threads rather than a whole process to continue execution on the second kernel, if desired.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of kernel panic recovery, comprising:
   detecting a kernel panic of a first kernel;
   retrieving at least some of a state of at least one thread running on the first kernel from at least one of a crash dump of the first kernel and a memory associated with the first kernel; and
   restoring the state of the at least one thread on a second kernel.

2. A method as claimed in claim 1, wherein the at least some of the state comprises at least one of text, data, stack, heap, processor registers and shared memory associated with the thread.

3. A method as claimed in claim 1, comprising determining files opened by the at least one thread running on the first kernel, and opening the files on the second kernel.

4. A method as claimed in claim 3, comprising updating the files on at least one of the first and second kernel with contents of a buffer cache.

5. A method as claimed in claim 1, wherein the first kernel is running on a first computing system, and the second kernel is running on a second computing system.

6. A method as claimed in claim 1, comprising executing the at least one thread on the second kernel.

7. A method as claimed in claim 1, wherein the at least one thread comprises a process.

8. A method as claimed in claim 1, wherein the at least some of the state is retrieved from at least one of a crash dump of the first kernel and a memory associated with the first kernel.

9. A system for kernel panic recovery, the system comprising a computer arranged to:
   detect a kernel panic of a first kernel;
   retrieve at least some of a state of at least one thread running on the first kernel; and
   restore the state of the at least one thread on a second kernel, wherein the at least some of the state is retrieved from at least one of a crash dump of the first kernel and a memory associated with the first kernel.

10. A system as claimed in claim 9, wherein the at least some of the state comprises at least one of text, data, stack, heap, processor registers and shared memory associated with the thread.

11. A system as claimed in claim 9, arranged to determine files opened by the at least one thread running on the first kernel, and open the files on the second kernel.

12. A system as claimed in claim 11, arranged to update the files on at least one of the first and second kernel with contents of a buffer cache.

13. A system as claimed in claim 9, wherein the computer system comprises a first computing system running the first kernel and a second computing system running the second kernel.

14. A system as claimed in claim 9, arranged to execute the at least one thread on the second kernel.

15. A system as claimed in claim 9, wherein the at least one thread comprises a process.

16. A system for kernel panic recovery, comprising:
   a first computing system including a first kernel and a process associated with an application running on the first kernel;
   a second computing system including a first kernel;
   the second computing system arranged to detect a kernel panic of the first kernel, retrieve at least some of a state of the process, restore the state of the process on a second kernel, and run the process on the second kernel.

17. A computer readable medium containing instructions, which, when executed by a processor, cause the processor to:
   detect a kernel panic of a first kernel prior to reset of a computing system including the first kernel;
   retrieve at least some of a state of at least one thread running on the first kernel from at least one of a crash dump of the first kernel and a memory associated with the first kernel; and
   restore the state of the at least one thread on a second kernel.

18. A computer readable medium as claimed in claim 17, wherein said instructions, when executed by the processor, further cause the processor to:
   determine files opened by the at least one thread running on the first kernel;
   open the files on the second kernel; and
   update the files on at least one of the first and second kernel with contents of a buffer cache.

19. A computer readable medium as claimed in claim 17, wherein the first kernel is running on a first computing system, and the second kernel is running on a second computing system.

* * * * *